3,010,953
PROTEIN MODIFICATION
Lloyd G. Unger, Riverside, and Doy W. Howland, La Grange, Ill., assignors to Corn Products Company, a corporation of Delaware
No Drawing. Filed May 13, 1958, Ser. No. 734,819
3 Claims. (Cl. 260—123)

This invention relates to a process for preparing a substantially undegraded zein that is soluble in water at a pH as low as 6.5.

The physical and chemical properties of proteins depend largely on the specific character and the relative proportions of the substituent groups which extend laterally from the peptide chain. By subjecting proteins to various conditions and reagents these substituent groups can be changed. This necessarily brings about a change in the physical and chemical properties of the proteins.

Zein, the alcohol-soluble protein from corn, is prepared commercially by extracting corn gluten with hot 80 percent isopropyl alcohol. It is commercially valuable because it can be spun into fibers and because it will form tough, adherent films. The uses of the film forming properties of zein have not been as great as originally hoped, due largely to the fact that, practically speaking, films must be cast from aqueous alcoholic solutions. This solvent is relatively expensive and thus adds considerably to the cost of zein films.

Numerous attempts have been made to utilize water as a zein solvent. If sufficient sodium hydroxide or other strong alkali is used, zein may be dissolved in water. The pH of these solutions must be above 11.5. Under these highly alkaline conditions useful films cannot be cast because strong alkali reacts to hydrolyze (degrade) the protein film. Further, these solutions are difficult and hazardous to handle because of their corrosive nature.

Films may be cast from dispersions of zein in water but two serious disadvantages have hindered their commercial utilization. First, the films necessarily contain the agents used to disperse the zein, generally fatty acid salts. The presence of these products reduces the resistance of the film to water and other reagents and often impairs film toughness and adhesion. A second disadvantage is that stable emulsions are often difficult to prepare especially if a high zein content is desired.

We have discovered that a slight but extremely significant chemical modification of zein will change its properties so that it may be dissolved in water at pH values as low as 6.5. This is accomplished by treating an aqueous solution of zein in a specified solvent medium with acid under properly controlled conditions. The nature of this modification can best be described by considering the chemical composition of zein, which may be represented by the formula

—NHCH(R')CONHCH(R'')CONHCH(R''')CO—

R represents the residue of any one of the 16 amino acids that are found on completely hydrolyzing zein. Of the various amino acids that make up zein, glutamine and asparagine constitute 23 mole percent. Thus, there are about 52 primary amide groups in a molecule of zein (molecular weight 25,000). In these cases, R in the above formula consists of —$CH_2CH_2CONH_2$ or —$CH_2CONH_2$. The primary amide groups (—$CONH_2$) are essentially neutral in reaction but on hydrolysis they form carboxyl groups which act as weak acids.

(1)
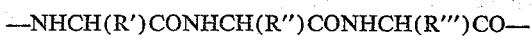
—$CH_2CH_2CONH_2 + H_2O \xrightarrow{(H+)} CH_2CH_2COOH + NH_3$

The presence of these new carboxylic acid groups in the zein molecule make it more readily soluble in water at a relatively low pH. We have found that zein that has been treated until it contains about 4 to 18 new carboxyl equivalents per mole of zein (25,000 g.) is ideal for our purpose.

In carrying out our invention it is necessary to avoid another reaction which may take place under the acid conditions disclosed in this invention, namely hydrolysis of the peptide bond. This reaction may be represented by the following equation:

(2)
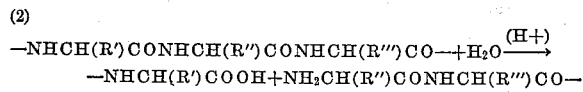
—NHCH(R')CONHCH(R'')CONHCH(R''')CO—+$H_2O \xrightarrow{(H+)}$
—NHCH(R')COOH+$NH_2$CH(R'')CONHCH(R''')CO—

This reaction is most undesirable for the purposes of this invention. If the peptide bond —CONH— is broken near the end of the protein chain, relatively small fragments are broken off. These fragments are water soluble and represent a loss of economically valuable protein. If the protein is broken in the middle, the chain length of the protein may be reduced to such a degree that its desirable film properties are lost.

Another type of reaction which is to be avoided in this invention is the transformation of the amide groups (—$CONH_2$) into ester groups (—COOR). The presence of such ester groups reduces the solubility of the zein in water.

The main object of this invention is to provide an economical process for preparing substantially undegraded zein which is soluble in water at a pH as low as 6.5. A further object is to accomplish this result by transforming the primary amide groups of zein into carboxyl groups (deamidation) without substantially hydrolyzing the peptide bonds and without esterifying the amide groups.

We have discovered that under carefully controlled conditions the deamidation reaction can be carried out without any substantial amount of peptide hydrolysis or esterification of amide groups. We have found that the desired reaction occurs if an aqueous solution containing about 15 to 30 percent by weight of zein in about 40 to 80 percent by weight of a solvent from the group consisting of aqueous secondary and tertiary aliphatic alcohols, acetone, and dioxane, is heated at about 80 to 140° C. for about 5 to 60 minutes, the reaction being carried out at a pH less than about 2.5 until it contains not more than about 18 new carboxyl groups per molecule of zein. The product thus obtained is soluble in water at a pH as low as 6.5.

Time, temperature and acid concentration are interdependent variables. At high acid concentration, i.e., 0.7 N sulfuric acid, short reaction times and/or moderate temperatures are required. At low concentrations, i.e., 0.1 N, longer reaction times and/or higher temperatures are necessary for the desired degree of reaction. The conditions preferred for use on a commercial scale are 6 minutes reaction time at 113° C. in the presence of about 0.35 N sulfuric acid.

Any strong mineral acid may be employed in our invention. Most of our experience has been with sulfuric acid since it is inexpensive and is relatively non-corrosive. However, either hydrochloric or phosphoric acid may be used satisfactorily. Although hydrochloric acid is more reactive than sulfuric acid, i.e., at equivalent concentrations more deamidation occurs with hydrochloric acid than with sulfuric, it is not sufficiently more reactive to offset its higher price. Furthermore, hydrochloric acid is more corrosive than sulfuric acid.

The unique feature of this invention is the use of our specified solvent system. The solvents which we have found will produce the desired results are aqueous secondary and tertiary aliphatic alcohols, acetone, and dioxane. If a primary alcohol such as ethyl or methyl is used, esterification of the newly formed carboxyl groups occurs, and the resulting zein has a substantially reduced solubility in water. At solvent concentrations below about 40 percent and above about 80 percent the unmodified zein is not too soluble.

In addition to acetone and dioxane any secondary or tertiary alcohol, such as isopropyl, isobutyl or tertiary butyl, may be employed in our invention. However, isopropyl alcohol is preferred for practical as well as economical reasons; the main reason being that in the commercial manufacture of zein from corn gluten there is available a solution of zein in aqueous isopropyl alcohol.

Our solvent system as the reaction medium for deamidation has another advantage over the colloidal suspension of protein in water used by previous investigators. The protein being in solution makes uniform attack on its molecule possible. This is important since we are then able to stop the reaction at a low degree of deamidation and be certain that there is essentially no unreacted zein in the system. A uniform degree of reaction is necessary to obtain a useful product at the low degrees of deamidation disclosed herein. Thus, a uniform reaction is necessary to obtain a product completely soluble at a pH as low as 6.5. The extent of the deamidation reaction may be determined quite simply. It is only necessary to titrate an aqueous solvent solution of the product and compare the titer with that of the unreacted zein similarly titrated. The course of the titration is best followed with a pH meter.

From an economical standpoint our process has many advantages. First, the chemical costs are low, as are the losses of protein, i.e., in making a zein product containing more than 18 new carboxyl groups per molecule, protein losses are quite high. A second advantage is that our process is readily adapted to continuous operation which effects considerable savings in the cost of equipment.

The product produced in accordance with our invention has unique properties, as illustrated below, which make it economically valuable. Its ability to form tough films from aqueous systems finds application in floor finish formulations, water-based inks, paper coatings and similar fields.

The following examples are given to illustrate this invention.

EXAMPLE 1

*Preparation of partially deamidated zein*

Two hundred ml. of flashed "heavy zein," a solution containing 56 grams of protein (N×6.25) in 55 percent by weight isopropyl alcohol, was placed in a 500 ml. 3-necked round bottom flask. Flashed "heavy zein" is produced during the commercial preparation of zein from corn gluten as described in an article which appeared on pages 226–229 of the September 1957 issue of Chemical Engineering entitled "Revamped Flow Sheet Wins Improved Zein." The flask was fitted with a thermometer, sealed mechanical stirrer and reflux condenser. Sulfuric acid (4 ml. of 96 percent) was added to obtain a pH of about 0.5 and the solution heated at reflux (83° C.) for 15 minutes. The flask and contents were cooled to below 50° C. and the pH brought from about 1.0 to about 5.0 by the addition of 5.0 N sodium hydroxide solution. The acid treated zein was then precipitated by quenching the solution in 2 liters of cold water. The precipitated zein was filtered, slurried in additional cold water, filtered and then dried by lyophilization.

The product contained 7.2 new carboxyl groups per molecule of zein. Only 1.1 percent of the protein was degraded by this treatment, as measured by the amount solubilized in the precipitation and wash waters.

Samples were run at various solvent concentrations. At solvent concentrations below about 40 percent and above about 80 percent, the unmodified zein was not too soluble.

EXAMPLE 2

*Preparation of partially deamidated zein*

Two hundred ml. of flashed "heavy zein" was treated in accordance with Example 1 using acetone instead of isopropyl alcohol.

The product contained 7.0 new carboxyl groups per molecule of zein. Only 1.0 percent of the protein was degraded by this treatment, as measured by the amount solubilized in the precipitation and wash waters.

EXAMPLE 3

*Preparation of partially deamidated zein*

Two hundred ml. of flashed "heavy zein" was treated in accordance with Example 1 using dioxane instead of isopropyl alcohol.

The product contained 6.7 new carboxyl groups per molecule of zein. Only 0.9 percent of the protein was degraded by this treatment, as measured by the amount solubilized in the precipitation and wash waters.

EXAMPLE 4

*Preparation of partially deamidated zein*

A continuous reactor was constructed. It consisted of a coil of stainless steel tubing supported in a steam chest. Suitable accessory equipment was installed so that a zein solution could be pumped into the coil and held in a liquid state under pressure for the desired length of time. In one experiment a 24 percent zein solution in 55 percent aqueous isopropyl alcohol was made 0.30 N with sulfuric acid (pH about 0.7). This acid solution was pumped through the coil at a rate such that the average holding time was 11 minutes. The temperature in the steam chest was 110° C. After cooling, the solution had a pH of about 1.5. The product was recovered from the isopropyl alcohol solution as described in Example 1 and was found to contain 8.7 new carboxyl groups per molecule of zein. The loss of protein due to degradation amounted to only 2.0 percent.

EXAMPLE 5

*Properties of partially deamidated zein*

Partially deamidated zein has several characteristics which make it uniquely useful. It is readily soluble in water at a pH as low as 6.5 (see table below).

| Acid treated zein [a] (new carboxys per molecule): | Minimum pH required for solution |
|---|---|
| 0 | 11.7 |
| 2.5 | 10.6 |
| 5.1 | 9.3 |
| 8.7 | 8.2 |
| 13.5 | 7.5 |
| 18.0 | 6.5 |

[a] pH of aqueous suspension of zein was raised slowly by addition of NaOH solution until a clear zein solution obtained.

From the above data it may be seen that a product containing 4–5 new carboxyls per molecule of zein has about the minimum number of new carboxyls required to obtain a product soluble in water at about pH 9.5. It may also be seen that there is little advantage in making a product containing more than about 18 new carboxyl groups since the less highly deamidated products are not only readily soluble at a moderate pH, but their loss of protein due to degradation is considerably less compared to the highly deamidated products (see table below).

| Number of new carboxyls per molecule of zein: | Protein losses, percent dry basis |
|---|---|
| 5.1 | 0.9 |
| 7.2 | 1.1 |
| 8.7 | 2.0 |
| 10.5 | 2.7 |
| 14.5 | 3.8 |
| 18.0 | 5.0 |

Solubility of our product in the pH range of 6.5 to 9.5 differs many advantages over unmodified zein. These acid modified zeins will dissolve in aqueous solutions of ammonia, borax, sodium carbonate, trisodium phosphate and other weak alkalis, and, since the molecular weight of the protein is essentially unchanged by partial deamidation, films cast from these aqueous systems have excellent properties. A 15 percent solution of acid modified zein in ammonia (2 percent $NH_3$ based on protein weight) was used to cast a film on a glass plate. A film of the same thickness was cast from a 15 percent solution of ordinary zein in 90 percent ethyl alcohol. After drying at room temperature overnight, the films were tested for hardness. Results of scratch tests indicated that the film of acid modified zein was slightly harder than that of ordinary zein. Both films were tested for spotting by placing a drop of water and of ammonia on the films and allowing the drops to evaporate overnight. Large white spots remained on the zein film but the acid modified zein film showed only small white spots where the drops had been.

Solutions of acid modified zein are generally less prone to gel than solutions of the parent zein. Since ordinary zein is not soluble in aqueous ammonia, the comparisons were made in sodium hydroxide solutions. Ordinary zein and various deamidated zeins were dissolved at 16 percent solids in 2 percent (based on zein) sodium hydroxide solutions and the time required for the sample to gel at room temperature determined. The results are tabulated below.

| Number of new carboxyls per molecule of zein: | Time to gel (days) |
|---|---|
| 0 | 3 |
| 4.1 | 2.5 |
| 6.0 | 6 |
| 9.7 | 15 |

It can be seen that aqueous alkaline solutions of the acid treated zeins are more stable than those of the original zein but none of these samples were stable indefinitely. The stabilities of alcohol solutions of various deamidated zeins were also determined. Solutions (33 percent) in 90 percent by volume ethanol were made and allowed to stand at room temperature until gelled. The results are shown below

| Number of new carboxyls per molecule: | Gel time, days |
|---|---|
| 0 | 14 |
| 7.0 | 9 |
| 9.0 | 7 |
| 12.7 | 2 |

It is apparent that partially deamidated zein forms alcohol solutions of lower stability than ordinary zein and forms aqueous alkaline solutions of greater stability.

We claim:

1. A process for the preparation of a partially primary amide group deamidated zein in substantially undegraded form that is soluble in water at a pH above about 6.5 which comprises preparing a solution of zein in an aqueous solvent medium, said solution containing about 15 to 30 percent by weight of zein in about 40 to 80 percent by weight of an aqueous solvent from the group consisting of aliphatic secondary and tertiary alcohols, acetone and dioxane; adjusting the pH of said solution to below about 2.5 by the addition to said solution of an acid selected from the group consisting of sulfuric acid, hydrochloric acid and phosphoric acid, and heating the thus acidified solution at a temperature of about 80 to 140° C. for about 5 to 60 minutes; the resulting primary amide group deamidated zein containing from about 4 to 18 carboxyl groups per molecule in excess of those present in the original zein.

2. A process according to claim 1 wherein said aliphatic secondary alcohol is isopropanol.

3. A substantially undegraded partially primary amide group deamidated zein containing from about 4 to 18 carboxyl groups per molecule in excess of those present in the original zein, said partially primary amide group deamidated zein being soluble in water at a pH above about 6.5.

References Cited in the file of this patent

UNITED STATES PATENTS

| 2,115,717 | Hansen | May 3, 1938 |
| 2,185,120 | Coleman | Dec. 26, 1939 |
| 2,185,124 | Coleman | Dec. 26, 1939 |
| 2,298,548 | Coleman | Oct. 13, 1942 |

OTHER REFERENCES

Nakashima: Chem. Abstracts, vol. 20, page 2337 (1926).

Evans et al.: Industrial and Engineering Chemistry, November 1941, pages 1416–1417.

Greenberg: Amino Acids and Proteins, page 38 (1951).

UNITED STATES PATENT OFFICE

CERTIFICATION OF CORRECTION

Patent No. 3,010,953                                              November 28, 1961

Lloyd G. Unger et al.

It is hereby certified that error appears in the above numbered patent requiring correction and that the said Letters Patent should read as corrected below.

Column 4, line 47, for "qarboxys" read -- carboxyls --; column 5, line 2, for "differs" read -- offers --.

Signed and sealed this 17th day of April 1962.

(SEAL)
Attest:

ESTON G. JOHNSON
Attesting Officer

DAVID L. LADD
Commissioner of Patents